Sept. 22, 1964  A. FISCHER  3,149,850

GASKET

Filed Aug. 6, 1962

INVENTOR:
ARTUR FISCHER

BY

Michael S. Striker
his ATTORNEY

3,149,850
GASKET
Artur Fischer, Tumlingen, Kreis Freudenstadt, Germany
Filed Aug. 6, 1962, Ser. No. 215,160
Claims priority, application Germany Aug. 10, 1961
6 Claims. (Cl. 277—227)

The present invention relates to gaskets in general, and more particularly to a composite gasket which is especially suited for use in connection with screws and similar fastening elements which are driven into sheets, blocks, plates or slabs consisting of concrete or the like.

Heretofore, such gaskets were made of lead or of elastically deformable synthetic plastic material. A plastic gasket of known construction resembles a hollow mushroom whose marginal portion expands very strongly when its central zone is subjected to compressive stresses by the head of a screw so as to bias the gasket into sealing engagement with the exposed surface of a corrugated concrete slab or the like. Such excessive expansion of the marginal portion produces internal stresses leading to fissures so that the gasket is rapidly destroyed or does not provide a fluidtight seal, especially if it is exposed to changing temperatures and to the action of moisture.

Accordingly, it is an important object of the present invention to provide a composite gasket which is especially suited for use as a seal beween the head of a fastening element and the exposed surface of a concrete slab or a like supporting structure into which the fastening element is driven, the gasket being constructed and assembled in such a way that its elastic component or components are subjected to uniform deforming stresses in all zones thereof to insure that one zone is not destroyed or damaged while the remaining zones are still capable of providing a fluidtight seal.

Another object of the invention is to provide a gasket of the just outlined characteristics which can be moved into and which can be maintained in fluidtight sealing engagement with corrugated, exceptionally rough and other uneven surfaces without any danger that the sealing engagement between the gasket and the rough surface would be terminated in response to slight displacements of the fastening element.

A further object of the invention is to provide a gasket of the above outlined characteristics which can be manufactured at low cost, which can be reused if desired, which can be manufactured of readily available materials, which is of lightweight construction, and whose component parts may be joined prior to actual use so that they cannot become separated from each other.

An additional object of the invention is to provide a sealing gasket which is capable of providing a fluidtight seal between the head of a fastening element and the uneven surface of a concrete slab or the like even if the fastening element is not driven home all the way.

With the above objects in view, the invention resides in the provision of a composite gasket comprising a one-piece or multi-piece pressure transmitting member having a through bore for the fastening element, an end face provided with an annular recess which surrounds the bore, and an annular edge portion which surrounds the recess, and an elastically compressible annular washer which is received in the recess and which projects beyond the edge portion of the pressure transmitting member so that it may be placed into abutment with the exposed surface of a supporting structure whereby the fastening element may cause the pressure transmitting member to deform the washer into sealing engagement with such surface.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
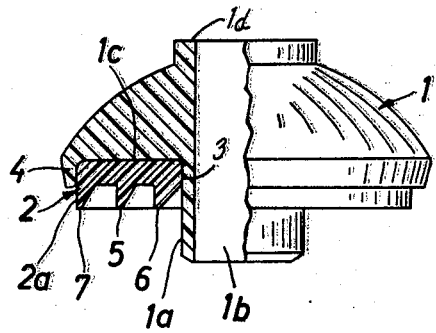
FIG. 1 is a partly elevational and partly axial sectional view of a gasket which embodies one form of my invention.
Figure 2:
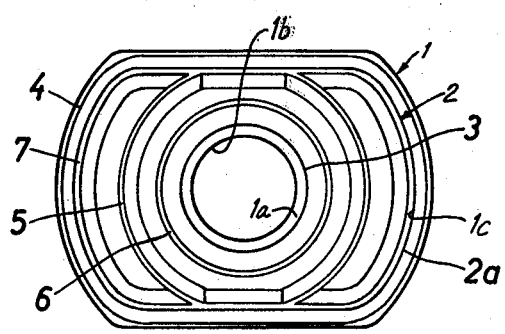
FIG. 2 is a bottom plan view of the gasket.

Referring now in greater detail to the illustrated embodiments, and first to FIGS. 1 and 2, there is shown a composite gasket which comprises a one-piece, cap-like pressure transmitting member 1 having a concentric tubular extension 1a and a through bore 1b which passes through the extension and which may receive the stem of a screw or a like fastening element, not shown. The extension 1a projects beyond the lower end face of the pressure transmitting member 1, and this end face is formed with an annular depression or recess 1c which surrounds the extension 1a and which is surrounded by an annular edge portion or bead 4 of uniform thickness so that the outline of the recess resembles the outline of the pressure transmitting member. The recess 1c receives and is filled by the main body portion of an elastically compressible annular washer 2 whose exposed face is formed with concentric ribs 5, 6 and 7 projecting beyond the edge portion 4 so that they may be deformed into sealing engagement with the exposed surface of an asbestos-reinforced concrete slab or a like supporting structure, not shown. The washer 2 is provided with a concentric aperture 3 whose diameter is such that the washer may receive the extension 1b and that the extension is retained by friction, i.e., the extension 1b is capable of holding the main body portion of the washer in the recess 1c. Furthermore, the dimensions of the washer 2 are preferably selected in such a way that its peripheral face 2a fits snugly into the edge portion 4 to insure that the washer remains in the recess 1c. As shown in FIG. 1, both component parts of the composite gasket may consist of synthetic plastic material; the material of the member 1 is a rigid, deformation-resistant, tough plastic in contrast to the washer 2 which consists of elastically compressible material having the characteristics of rubber.

FIG. 2 shows that the pressure transmitting member 1 preferably assumes the outline of a rectangle whose shorter sides are rounded, and that the washer 2 is of similar outline. An important advantage of a substantially rectangular washer is that it responds to minimal compressive stresses to move into sealing engagement with the exposed surface of a masonry structure or the like. This is due to the fact that the area of the sealing end face of a rectangular washer is considerably less than the area of a round washer whose radius equals the radius of curvature of the outermost rib 7. Moreover, if the parts 1, 2 are of rectangular shape, it is very easy to position the gasket in such a way that its longitudinal extension is parallel with the crests and troughs of a corrugated surface on a concrete slab or the like.

Since the main body portion of the washer is received in the recess 1c, the washer is protected against ultraviolet rays which could cause fissures and resultant destruction of the plastic material. The ribs 5–7 form at least one complete annulus which extends all the way about the extension 1b to provide a fluidtight seal about the latter when the material of the washer is compressed by the head of a screw or a similar fastening element driven into the exposed surface against which the ribs abut at the time the head of the fastening element bears against the upper end face 1d of the pressure transmitting member 1, as viewed in FIG. 1. The ribs 5–7 form a very reliable seal regardless of whether the exposed surface of the supporting structure is flat, convex, concave, undulate, exceptionally rough, or exhibits other types of regularly or irregularly distributed raised portions.

Figure 3:
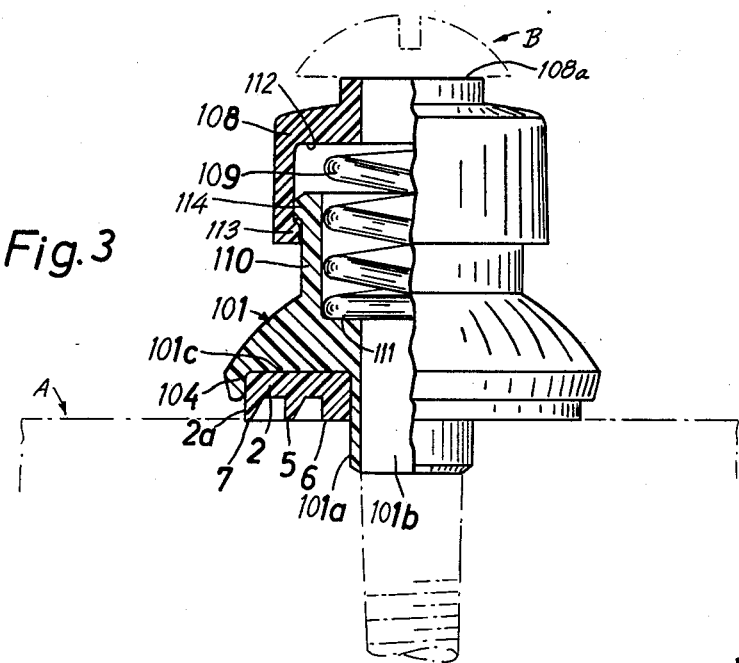
FIG. 3 is a partly elevational and partly axial sectional view of a modified gasket.

FIG. 3 illustrates a modified gasket comprising a two-piece pressure transmitting member including an inner section or cap 101 having a tubular extension 101a, a through bore 101b and an upwardly extending tubular sleeve 110 which accommodates a resilient element here shown as a helical spring 109. The section 101 is formed with an internal shoulder 111 for one end convolution of the spring 109 whose other end convolution abuts against the internal shoulder 112 of a second or outer cap 108 constituting the second section of the two-piece pressure transmitting member. The section 108 comprises a tubular portion which is slidably fitted onto the sleeve 110 and the open end of this tubular portion is provided with an inwardly extending annular coupling element or collar 113 engaging with a complementary coupling element here shown as an external annular flange 114 at the open end of the sleeve 110 so that the spring 109 cannot separate the sections 101, 108 from each other. The construction of the washer 2 is the same as described in connection with FIGS. 1 and 2, i.e., its peripheral face 2a is fitted into the annular edge portion 104 and its main body portion is received in the recess 101c of the pressure transmitting section 101. In FIG. 3, the washer 2 is bonded to the section 101 by a suitable adhesive substance.

The gasket of FIG. 3 is utilized as follows:

The exposed upper surface of a concrete slab A or a similar supporting structure is formed with a bore for the extension 101b so that the ribs 5–7 may be placed into abutment with the exposed surface. A screw B or a similar fastening element is then passed through the sections 101, 108 and is driven into the material of the structure A so that its head bears against the outer end face 108a of the section 108 and compresses the spring 109 which transmits pressure to the section 101 and to the washer 2 which is deformed into sealing engagement with the exposed surface of the structure A. It will be noted that the sections 101, 108 of the two-piece pressure transmitting member normally tend to move away from each other under the bias of the spring 109. An important advantage of such construction of the motion transmitting member is that the spring 109 maintains the washer 2 under compression even if the fastening element B is not driven all the way into and has some freedom of axial movement with respect to the structure A.

Common to all embodiments of my invention is the feature that a slight compressive force is sufficient to move the ribs 5–7 of the washer 2 into sealing engagement with the exposed surface of a supporting structure consisting of corrugated concrete, of asbestos-containing concrete or the like.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A composite gasket, particularly for providing a seal between the head of a fastening element and the exposed surface of a supporting structure consisting of concrete or the like, said gasket comprising a composite pressure transmitting member having a through bore for the fastening element, said member including two sections which are movable toward and away from each other in the axial direction of said bore and resilient means for biasing said sections away from each other, one of said sections having an end face provided with an annular recess surrounding said bore and an annular edge portion surrounding said recess; and an elastically compressible annular washer received in said recess and projecting beyond said edge portion so that it may be placed into abutment with an exposed surface whereby a fastening element which passes through said bore and into the supporting structure and whose head engages the other of said sections may compres said resilient means thus causing said one section to deform the washer into sealing engagement with such surface.

2. A composite gasket, particularly for providing a seal between the head of a fastening element and the exposed surface of a supporting structure consisting of concrete or the like, said gasket comprising a composite pressure transmitting member having a through bore for the fastening element, said member including two sections which are movable toward and away from each other in the axial direction of said bore and resilient means for biasing said sections away from each other, one of said sections having an end face provided with an annular recess surrounding said bore and an annular edge portion surrounding said recess, said one section further having a tubular sleeve at its end distant from said end face and the other of said sections having a tubular portion surrounding and slidable along said sleeve; and an elastically compressible annular washer received in said recess and projecting beyond said edge portion so that it may be placed into abutment with an exposed surface whereby a fastening element which passes through said bore and into the supporting structure and whose head engages the other of said sections may compress said resilient means thus causing said one section to deform the washer into sealing engagement with such surface.

3. A composite gasket, particularly for providing a seal between the head of a fastening element and the exposed surface of a supporting structure consisting of concrete or the like, said gasket comprising a composite pressure transmitting member having a through bore for the fastening element, said member including two sections which are movable toward and away from each other in the axial direction of said bore, said sections having internal shoulders and said member further including a helical spring disposed between said shoulders for biasing said sections away from each other, one of said sections having an end face provided with an annular recess surrounding said bore and an annular edge portion surrounding said recess, said one section further having a tubular sleeve at its end distant from said end face and the other of said sections having a tubular portion surrounding and slidable along said sleeve; and an elastically compressible annular washer received in said recess and projecting beyond said edge portion so that it may be placed into abutment with an exposed surface whereby a fastening element which passes through said bore and into the supporting structure and whose head engages the other of said sections may compress said resilient means thus causing said one section to deform the washer into sealing engagement with such surface.

4. A composite gasket, particularly for providing a seal between the head of a fastening element and the exposed surface of a supporting structure consisting of concrete or the like, said gasket comprising a composite pressure transmitting member having a through bore for the fastening element, said member including two sections which are movable toward and away from each other in the axial direction of said bore and resilient means for biasing said sections away from each other, one of said sections having an end face provided with an annular recess surrounding said bore and an annular edge portion surrounding said recess, said one section further having a tubular sleeve at its end distant from said end face and the other of said sections having a tubular portion surrounding and slideable along said sleeve, said sleeve and said tubular portion comprising cooperating coupling means which prevent separation of said sections from each other; and an elastically compressible annular washer received in said recess and projecting beyond said edge portion so that it may be placed into abutment with an exposed surface whereby a fastening element which passes through said bore and into the supporting structure and whose head engages the other of said sections may compress said resilient means thus causing said one section to deform the washer into sealing engagement with such surface.

5. A composite gasket, particularly for providing a seal between the head of a fastening element and the exposed surface of a supporting structure into which the fastening element is driven, said gasket comprising a pressure transmitting member consisting of rigid synthetic plastic material, said member having a through bore for the fastening element, an end face provided with an annular recess surrounding said bore, an annular edge portion surrounding said recess, and a tubular extension projecting beyond said end face and beyond said edge portion and receivable in a bore in the spaced surface of the supporting structure; and an annular washer of elastically compressible synthetic plastic material, said washer received in said recess and projecting beyond said edge portion so that it may be placed into abutment with an exposed surface whereby the fastening element may cause said pressure transmitting member to deform the washer into sealing engagement with such surface.

6. A composite gasket, particularly for providing a seal between the hand of a fastening element and the exposed surface of a supporting structure consisting of concrete or the like, said gasket comprising a composite pressure transmitting member having a through bore for the fastening element, said member including two sections which are movable toward and away from each other in the axial direction of said bore and resilient means for biasing said sections away from each other, one of said sections having an end face provided with an annular recess surrounding said bore, an annular edge portion surrounding said recess, and a tubular extension projecting beyond said end face and beyond said edge portion and receivable in a bore in the exposed surface of the supporting structure; and an elastically compressible annular washer received in said recess and projecting beyond said edge portion so that it may be placed into abutment with an exposed surface whereby a fastening element which passes through said bore and into the supporting structure and whose head engages the other of said sections may compress said resilient means thus causing said one section to deform the washer into sealing engagement with such surface.

References Cited in the file of this patent

UNITED STATES PATENTS

| | | |
|---|---|---|
| 2,540,145 | Stevens | Feb. 6, 1951 |
| 2,706,656 | Rouhall | Apr. 19, 1955 |
| 2,858,156 | Wooton | Oct. 28, 1958 |
| 2,949,325 | Nenzell | Aug. 16, 1960 |

FOREIGN PATENTS

| | | |
|---|---|---|
| 20,687 | Great Britain | Sept. 16, 1904 |
| 865,654 | Great Britain | Apr. 19, 1961 |
| 969,871 | France | Dec. 27, 1950 |